(12) United States Patent
Kinkead et al.

(10) Patent No.: US 6,431,494 B1
(45) Date of Patent: Aug. 13, 2002

(54) FLIGHT CONTROL SYSTEM FOR A HYBRID AIRCRAFT IN THE ROLL AXIS

(75) Inventors: W. Douglas Kinkead, Wallingford; Mark W. Scott, Bethany, both of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/907,006

(22) Filed: Jul. 17, 2001

(51) Int. Cl.[7] .............................................. B64C 13/16
(52) U.S. Cl. .................. 244/76 B; 244/195; 244/17.13
(58) Field of Search ........................ 244/23 B, 6, 182, 244/76 B, 225, 17.13, 185, 195; 701/301.4, 10, 7; 340/967, 969, 970

(56) References Cited

U.S. PATENT DOCUMENTS

| | | |
|---|---|---|
| 4,573,125 A | 2/1986 | Koenig |
| 5,141,177 A | 8/1992 | Wright et al. |
| 5,226,350 A | 7/1993 | Cycon et al. |
| 5,364,230 A | 11/1994 | Krauss et al. |
| 6,189,836 B1 | 2/2001 | Gold et al. |
| 6,270,038 B1 * | 8/2001 | Cycon et al. .............. 244/12.2 |

FOREIGN PATENT DOCUMENTS

| | | |
|---|---|---|
| WO | WO00/64736 | 4/2000 |

* cited by examiner

Primary Examiner—Peter M. Poon
Assistant Examiner—Timothy D. Collins
(74) Attorney, Agent, or Firm—Carlson Gaskey & Olds

(57) ABSTRACT

A flight control system includes a blending algorithm which evaluates the current flight regime and determines the effectiveness of the flight controls to effect the rotational moment of a hybrid vehicle about the roll axis. Gain schedules for both roll cyclic and aileron control provide a quantitative measure of control effectiveness. Based on the respective gain schedules, the algorithm determines how much of the control commands should be sent to each control surface. The result is that for a given control command, the same amount of roll moment will be generated regardless of flight regime. This simplifies the underlying flight control law since the commands it generates are correct regardless of flight regime.

19 Claims, 5 Drawing Sheets

FLIGHT CONTROL SYSTEM FOR A HYBRID AIRCRAFT IN THE ROLL AXIS

This invention was made with government support under Contract No.: M67854-99C-2081 awarded by the Department of the Army. The government therefore has certain rights in this invention.

BACKGROUND OF THE INVENTION

The present invention relates to a flight control system for a hybrid aircraft, and more particularly, to a flight control system for a hybrid unmanned aerial vehicle (UAV) which blends command signals to a multiple of vehicle control surfaces during transition between rotor borne and wing borne flight.

There is an increased emphasis on the use of UAVs for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

A hybrid aircraft provides the hover and low-speed maneuverability of a helicopter with the high-speed forward flight and duration capabilities of a winged aircraft. Typically, hybrid aircraft include a helicopter control surface system which provides cyclic pitch, collective pitch and differential rotation to generate lift, pitch, roll, and yaw control when operating in a hover/low-speed environment. Additionally, the hybrid aircraft includes a conventional fixed wing aircraft control surface system such as aileron, elevator, rudder and flaps to provide control when operating in a high-speed environment. Hybrid aircraft also typically include a separate translational propulsive system.

When the hybrid aircraft is operating in a hover/low-speed environment, maneuverability is achieved by controlling the helicopter control system. When the hybrid aircraft is operating in a high-speed environment, the hybrid aircraft operates as a fixed wing aircraft and maneuverability is achieved by controlling the aircraft flight control surfaces. As the hybrid aircraft transitions between helicopter and aircraft control surface systems, however, neither the helicopter nor the aircraft control systems are completely effective. Moreover, the relationship between control displacement and control moment is nonlinear and the aerodynamic forces on the aircraft change most dramatically. Flight control within this region is therefore rather complex.

Accordingly, it is desirable to provide a hybrid aircraft flight control systems which automatically blends command signals to a multiple of vehicle flight control surfaces during transition between rotor borne and wing borne flight. It is further desirable to provide the same amount of vehicle control regardless of the vehicle's flight regime.

SUMMARY OF THE INVENTION

A hybrid aircraft includes a flight control system according to the present invention. The hybrid aircraft can hover like a helicopter using a rotor system or fly like a fixed wing aircraft using conventional fixed wing controls such that it is operable in four flight regimes:

1. Hover—Defined as low speed operation. The rotor generates control and lift.
2. Forward Flight—Lift is generated by the wings and all control is through the fixed wing surfaces (elevator, ailerons, rudder)
3. Transition Up—This mode guides operation of a multiple of control surfaces when flying from Hover to Forward Flight.
4. Transition Down—This mode guides operation of a multiple of control surfaces when flying from Forward Flight to Hover.

The flight control system according to the present invention includes a blending algorithm which evaluates the current flight regime and determines the effectiveness of the various flight control surfaces. In the roll axis, gain schedules for roll cyclic (rotor) and aileron control are used as a quantitative measure of control effectiveness. Based on the respective gain schedules, the blending algorithm determines how much of an input command is sent to each control surface. The result is that for a given command, the same amount of roll moment will be generated regardless of flight regime. This simplifies the underlying flight control laws since the commands it generates are correct regardless of flight regime.

The present invention therefore provides a hybrid aircraft flight control system which automatically blends roll command signals between roll cyclic and aileron flight control surfaces during transition between rotor borne and wing borne flight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
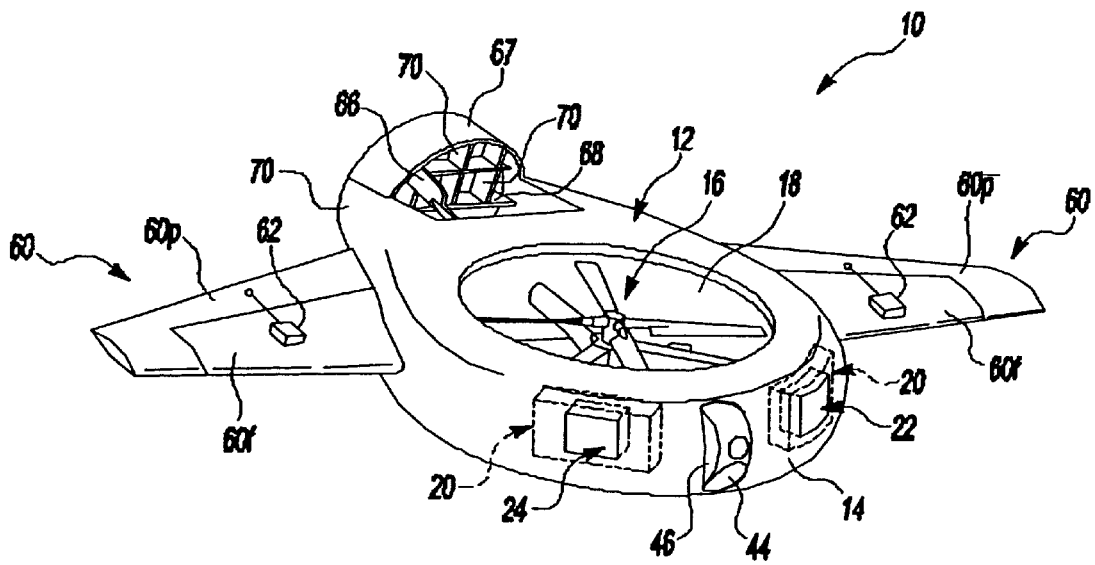
FIG. 1 is a general perspective view of an exemplary hybrid aircraft having a flight control system according to the present invention.

FIG. 1 illustrates a hybrid aircraft 10, such as the CYPHER2 UAV developed by Sikorsky Aircraft Corporation. For further understanding of the UAV embodiment and associated components thereof, attention is directed to U.S. patent application Ser. No. 09/296,624 filed Apr. 22, 1999 and entitled "Unmanned Aerial Vehicle With Counter-Rotating Ducted Rotors and Shrouded Pusher-Prop," which is assigned to the assignee of the instant invention and which is hereby incorporated herein in its entirety. It should be further understood that other hybrid aircraft (manned and unmanned) having multiple flight control surfaces will also benefit from the instant invention.

The aircraft 10 includes a fuselage 12 with a toroidal portion 14 having a generally hemi-cylindrical aerodynamic profile. A rotor assembly 16 is mounted within a duct 18 that extends substantially vertically through the fuselage 12. The fuselage 12 includes a plurality of accessible internal bays 20 for housing and/or storing aircraft flight and mission components. Preferably, the bays house a powerplant system 22 and a flight control system 24.

Figure 1A:
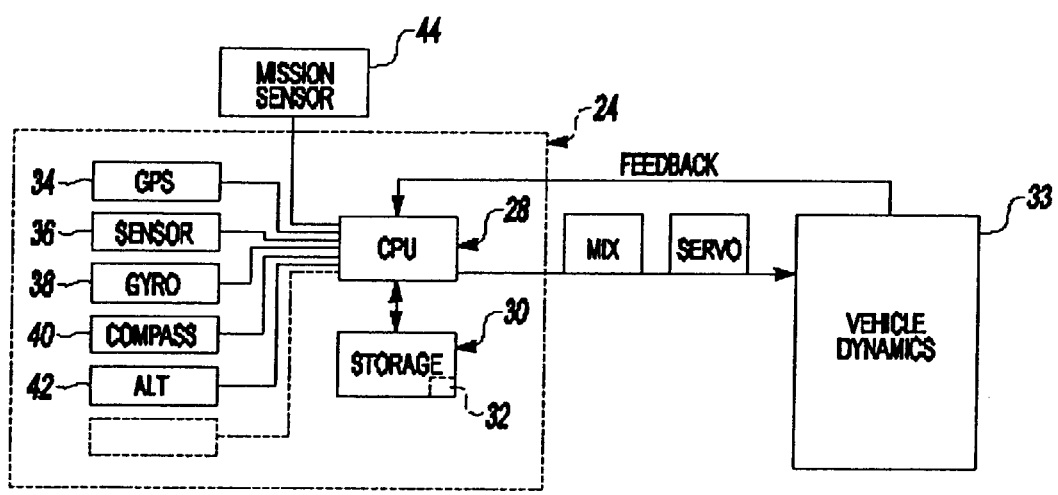
FIG. 1A is a block diagram of the flight control system.

Th[0085] flight control system 24 preferably includes a CPU 28 and storage device 30 connected to the CPU 28 (FIG. 1A). The storage device 30 may include a hard drive, CD ROM, DVD, RAM, ROM or other optically readable storage, magnetic storage or integrated circuit. As will be further described, the storage device 30 contains a database 32 including preprogrammed flight control law strategy associated with a blending algorithm for the control of the vehicle dynamics (illustrated schematically at 33) through servo actuators and a mixing circuit or the like. The control strategy preferably maintains parameters such as pitch attitude, roll attitude and heading at a desired point to provide control of the vehicle 10.

The flight control system 24 may alternatively or additionally include a Primary Flight Control System (PFCS) and an Automatic Flight Control Systems (AFCS) as are well known. The AFCS and PFCS software algorithms may be stored in the storage device 30 or alternatively in removable ROM, RAM or flash memory. The AFCS and PFCS provide feedback mechanisms having linear control system logic such as proportional, integral, derivative (PID) paths to achieve the desired response and compensate for undesired destabilization forces acting on the vehicle 10.

The flight control system 24 further includes transmitters, receivers, navigation, sensors and attitude sensors, such as a GPS receiver 34 and multi-axis accelerometers 36. The flight control system 24 may alternatively or additionally include one or more gyros 38, a compass 40, and an altimeter 42, all connected to the CPU 28 to detect vehicle dynamics and flight path parameters. The sensors may also include any device capable of outputting an acceleration vector signal representing sensed vehicle motion and/or receiving control surface displacement. Such devices (as well as others) are well known in the aircraft field.

Other mission related sensors 44 (also illustrated in FIG. 1), such as a camera system, forward looking infrared radar (FLIR) sensor, laser designator, thermal imager, or the like are also preferably located in a trainable turret 46 (FIG. 1) in a forward area of the vehicle 10. It should be understood that although a particular component arrangement is disclosed in the illustrated embodiment, other arrangements will benefit from the instant invention.

Figure 1B:
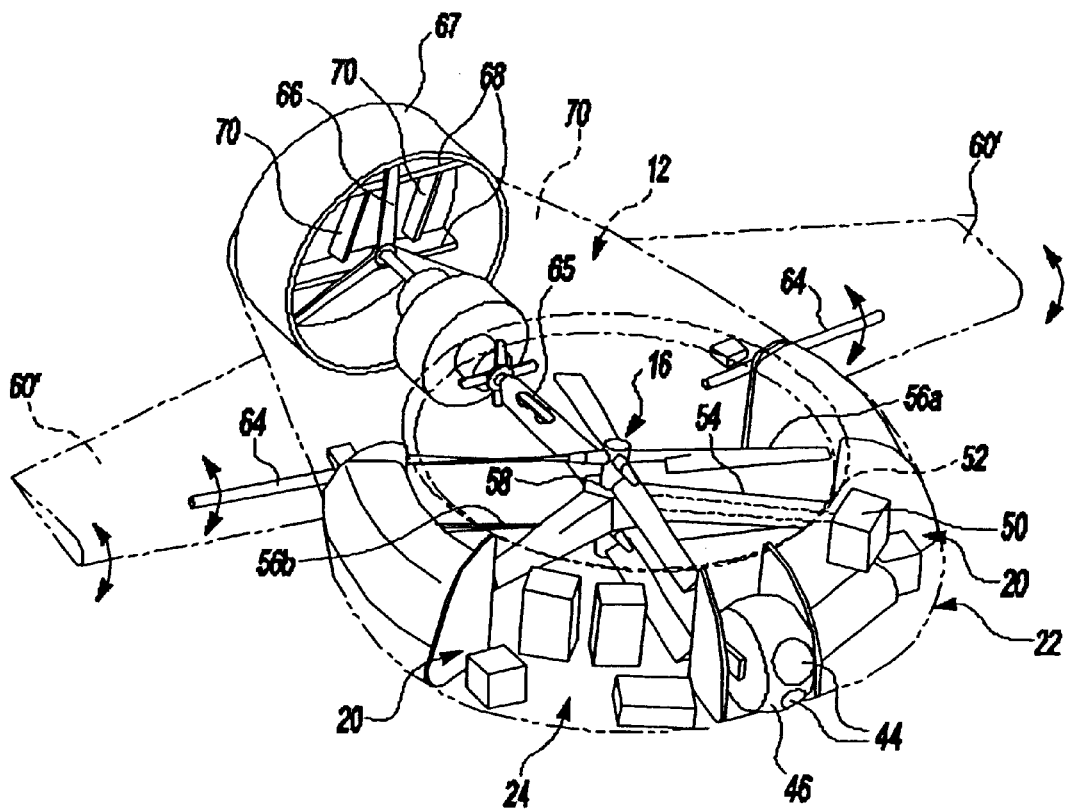
FIG. 1B is a partially phantom view of another exemplary hybrid aircraft having a flight control system according to the present invention.

Referring to FIG. 1B, the power plant subsystem 22 transfers power developed by an engine (illustrated schematically at 50) to the rotor assembly 16 by a drive shaft 52. A plurality of hollow struts 54 extend between the fuselage 12 and the rotor assembly 16 to support the rotor assembly 16 therein. The support struts 54 provide structural rigidity to the aircraft duct 18 to prevent flight and ground loads from distorting the fuselage 12 and provide conduits for interconnecting operating elements of the aircraft 10 such as the engine drive shaft 52 and electrical wiring for various operating components.

The rotor assembly 16 includes a pair of multi-bladed, counter-rotating rotors 56a, 56b, coaxially aligned within the duct 18, and a coaxial transmission subassembly therebetween (illustrated somewhat schematically at 58). Each counter-rotating rotor 56a, 56b preferably includes a plurality of blade assemblies in which blade pitch changes induced in the counter-rotating rotor systems 56a, 56b, i.e., cyclic and/or collective pitch inputs, can be utilized to generate lift, pitch, yawl, and roll control of the aircraft 10. Roll control is preferably provided by roll cyclic of the multi-bladed, counter-rotating rotors 56a, 56b through upper and lower swashplates (FIG. 3; illustrated schematically at 57) which are controlled through a mixer circuit (FIG. 3; illustrated schematically at 59) or the like.

Wings 60 extend laterally outward from the aircraft fuselage 12 to provide high lifting forces and a large nose-down pitching moment in forward translational flight. Those skilled in the art would readily appreciate the diverse wing arrangements that can be incorporated into a UAV according to the present invention. Preferably, each wing 60 includes a fixed stub portion 60F and a pivotal flight control surface portion 60P such as a flaperon or aileron. The flight control surface portion 60P preferably includes a flaperon hingedly mounted to the trailing edge of the wing 60. A servo actuator 62 mounted within the fixed portion 60F controls the pivoting of the pivotal portion 60P. Alternatively, or in addition, the entire wing 60' may pivot such that a drive rod 64 independently changes the angle of attack of the wing 60' (FIG. 1B).

In order to provide translational thrust, the aircraft 10 includes a pusher prop 66 mounted to the rear of the vehicle 10. The propeller 66 is mounted to a drive shaft 65 which, in turn, is engaged with the powerplant subsystem through a flexible coupling or the like. The prop 66 is preferably mounted to the rear of the aircraft with its rotational axis oriented substantially horizontal.

A prop shroud 67 is formed on the aft fuselage 70 and around the pusher prop 66. The cross-sectional shape of the shroud 67 is preferably configured as an airfoil to provide the shroud 68 with some lift component. Mounted on the shroud 68 aft of the pusher prop 66 are one or more horizontal and vertical control surfaces 68, 70. Preferably, the control surfaces 68, 70 are pivotally mounted to the shroud 67 to permit the exhausted air to be channeled in a controllable manner such that the horizontal control surfaces 68 function as elevators and the vertical control surfaces 70 function as rudders.

Figure 2A:
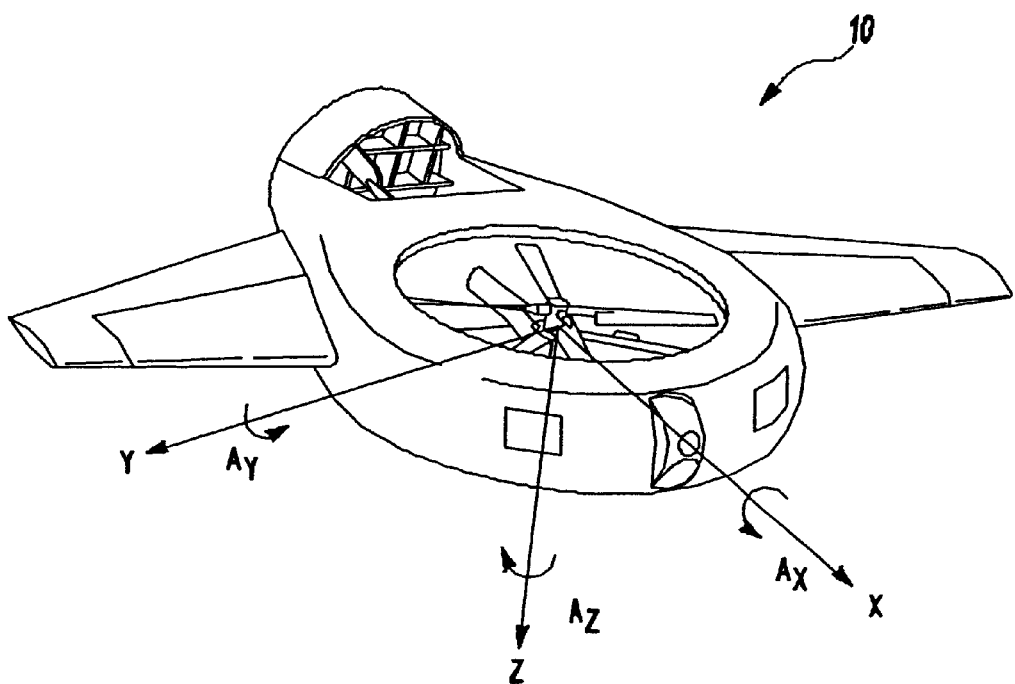
FIG. 2A is a schematic representation of vector axes superimposed on the vehicle of FIG. 1.
Figure 2:
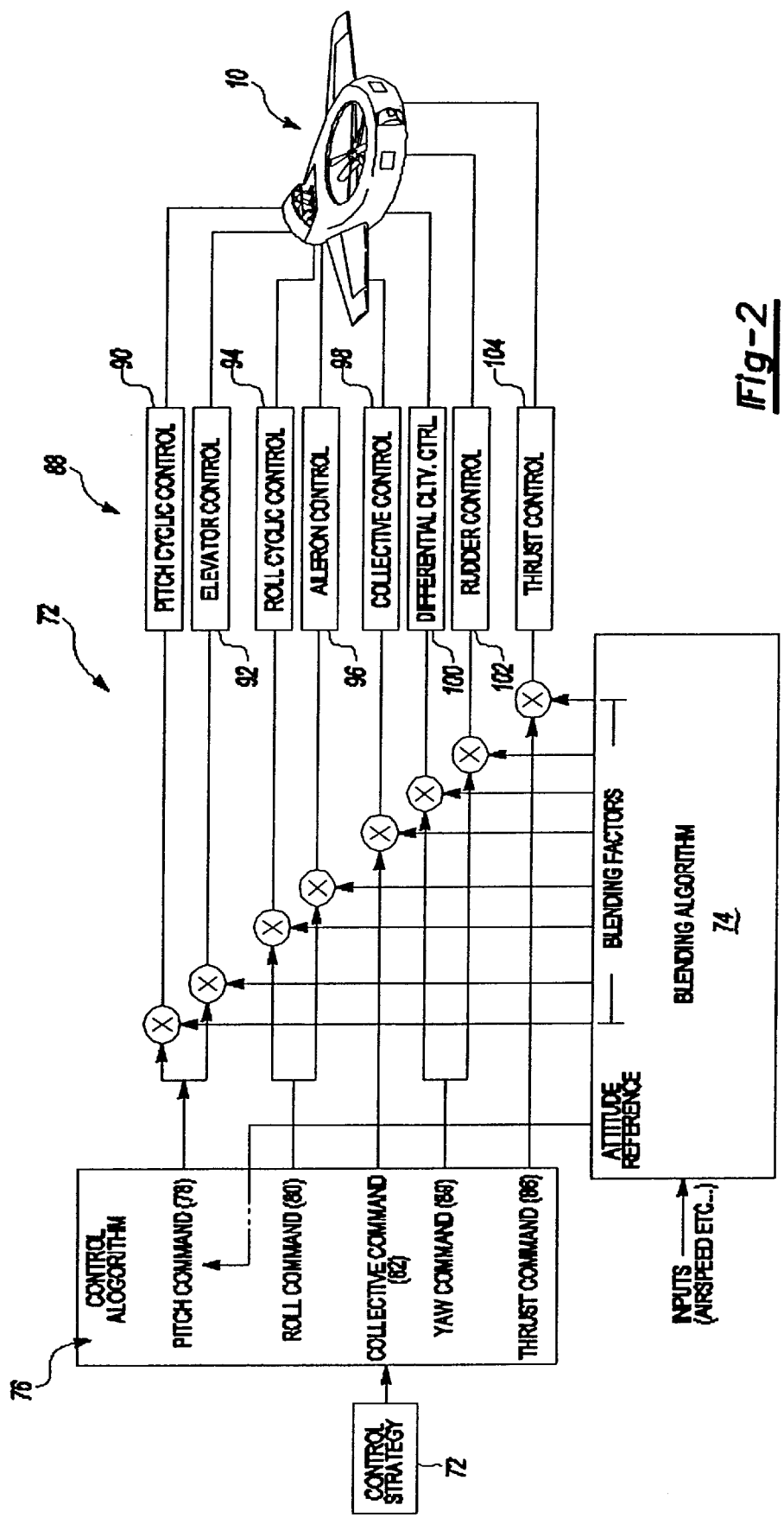
FIG. 2 is a general schematic block diagram of the flight control law strategy provided by the flight control system of FIG. 2.

Referring to FIG. 2, a block diagram of the inventive flight control law strategy 72 having a blending algorithm 74 is schematically illustrated. The blending algorithm 74 insures smooth, controllable flight in all flight regimes. This is of particular importance in the transition flight region. Below transition, the aircraft maneuvers like a helicopter utilizing the rotor exclusively for roll control. Above transition, the aircraft maneuvers like a fixed wing airplane utilizing the movable wing portion 60P exclusively for roll control. Above and below transition, the appropriate control surface is provided with full authority. That is, below transition, the rotor system is movable through its entire control range and above transition, the aircraft control surfaces are movable through their entire control range. During transition, the aircraft uses both the rotor system and movable wing portions 60P to control roll. In this region, the relationship between control displacement and control moment is most nonlinear. Transition is also the region where the aerodynamic forces on the aircraft change most dramatically. The blending algorithm compensates for these effects and thereby improves control.

A control algorithm 76 preferably outputs a pitch command 78, a roll command 80, a collective command 82, a yaw command 84 and a thrust command 86. The flight control commands 78–86 are generated by manual input from an operator, the flight control system 24 or a combination thereof.

Orthogonal vector axes superimposed on the vehicle 10 (FIG. 2A) illustrate that the pitch command 78 provides angular moment about the Y axis (Ay); the roll command 80 provides angular moment about the X axis (Ax); the collective command 82 provides thrust along the Z axis; the yaw command 84 provides angular moment about the Z axis (Az); and the thrust command 86 thrust along the X axis. It should be understood that numerous hybrid aircraft flight control systems will benefit from the blending algorithm of the instant invention.

The flight control command 78–86 are output to a multiple of movable control surfaces 88 to achieve the desired moment about the desired axis or axes. In the disclosed embodiment, the movable control surfaces 88 include a pitch cyclic control 90, elevator control 92, roll cyclic control 94, aileron control 96, collective control 98, differential collective control 100, rudder control 102, and thrust control 104.

Each flight control command 78–86 is output to one or more movable control surfaces 90–104 to control the vehicle in a particular axis. The control commands 78–86 are actuating commands which are sent to a servo actuator, a mixing circuit for a plurality of servos which control the swashplates (FIG. 3) or the like which are suitably arranged to control the rotor blades and/or otherwise adjust the movable controls. Preferably, one of the control surfaces 90–104 is primarily a helicopter flight control surface, while the other is primarily a conventional aircraft flight control surface.

In the disclosed embodiment, the pitch command 78 is associated with the pitch cyclic control 90 and the elevator control 92; the roll command 80 is associated with the roll cyclic control 94, and the aileron control 96; the collective command 82 is associated with the collective control 98; the yaw command 84 is associated with the differential collective control 100 and the rudder control 102; and the thrust command 86 is associated with the thrust control 104 (FIGS. 1A and 1B; pusher prop 66). Although particular controls are disclosed in the illustrated embodiment, it should be understood that other combinations of movable control surfaces, and other types of controls such as slats, flaps, flaperons, puffer ducts, articulatable nozzles, elevons, and the like will also benefit from the instant invention. It should be further understood that the term aileron is defined to include conventional ailerons, flaperons, elevons and other controls which provide a roll moment other than rotor-type cyclic controls.

Figure 3:
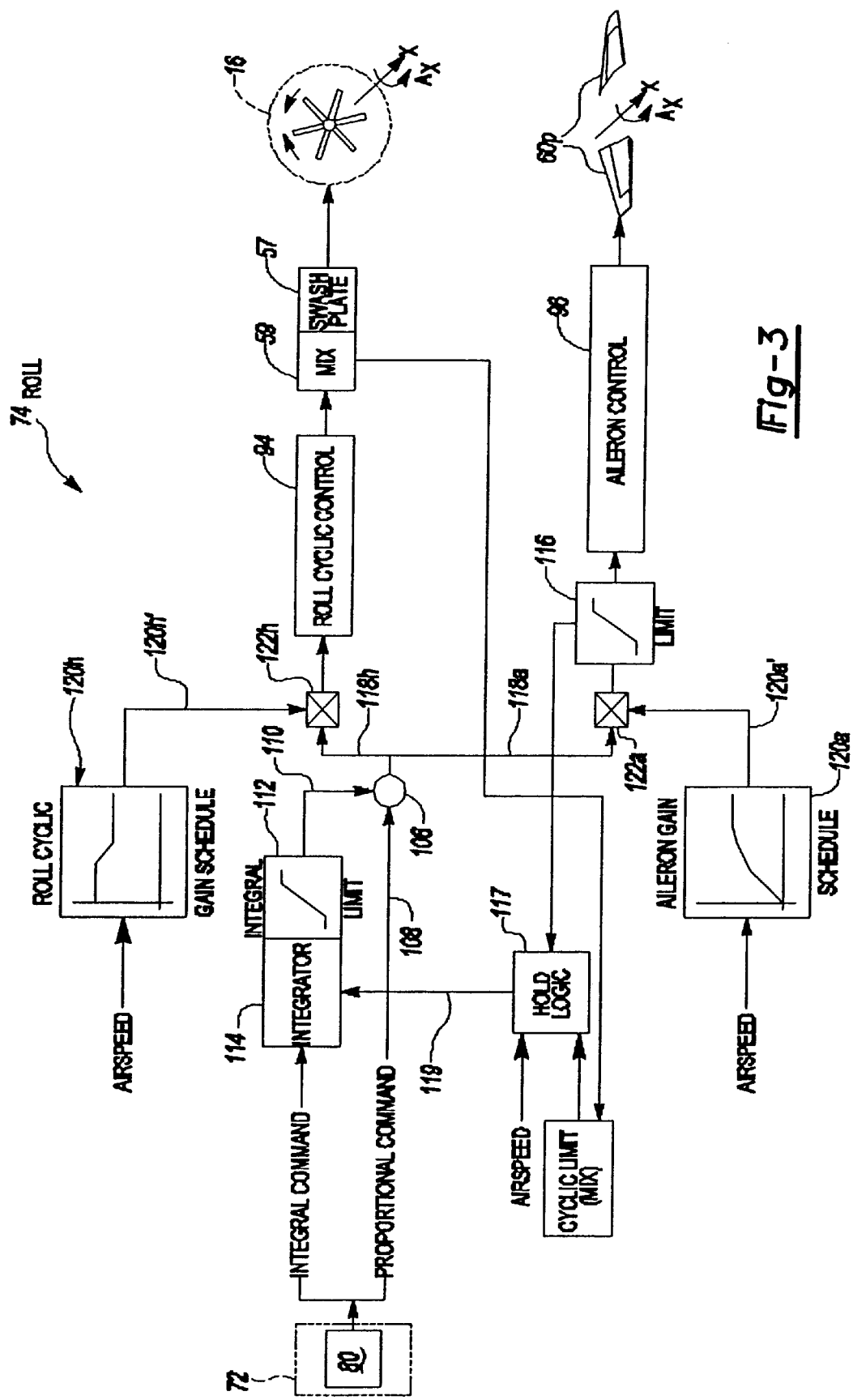
FIG. 3 is a detailed block diagram of one embodiment of a blending algorithm.

Referring to FIG. 3, the blending algorithm 74 in the roll axis (74roll) is schematically illustrated. The roll blending algorithm 74roll is preferably operable when the vehicle is in the transition flight region.

Roll summing circuit 106 receives the roll command input 80 (also shown in FIG. 2) preferably in proportional plus integral form. The proportional and integral commands are the primary control commands and are computed by the underlying control laws within the flight control strategy 72. That is, a proportional roll command 108 is summed with an integral roll command 110 which has been limited by a limiting circuit 112.

As generally known, limiting circuits prevents a signal from exceeding a certain specified magnitude or dropping below a certain magnitude thereby providing authority limits. Limit 112 controls the rate of the output of the roll integrator 114. Roll integrator unit 114 is used to maintain a desired roll cyclic control 94 and/or aileron control 96 without the necessity of constant displacement of the roll command 80. The limiting circuit 112 preferably prevents the roll integrator 114 from greatly exceeding a predetermined limit commonly known as "integrator wind-up." To further assure that the roll integrator 114 does not exceed the maximum travel of the aileron 60P, a second limiter 116 is provided in a feed back path. If limiter 116 is reached, limiter 116 assists limit 112 to assure the roll integrator 114 is held in the limited direction thereby preventing the exceeding of control surface mechanical limits and integrator wind-up.

Preferably, the feed back from the second limiter 116 is fed back to a hold logic circuit 117. The hold logic circuit 117 receives other inputs such as airspeed and cyclic position from the mixing circuit 59. The hold logic circuit 117 generates a hold command signal to the roll integrator 114 through line 119. The hold logic circuit 117 provides a predetermined hold or trim to the swashplates 57 which compensates for shifts in the cyclic trim positions caused by airspeed relative aerodynamic conditions.

Figure 4:
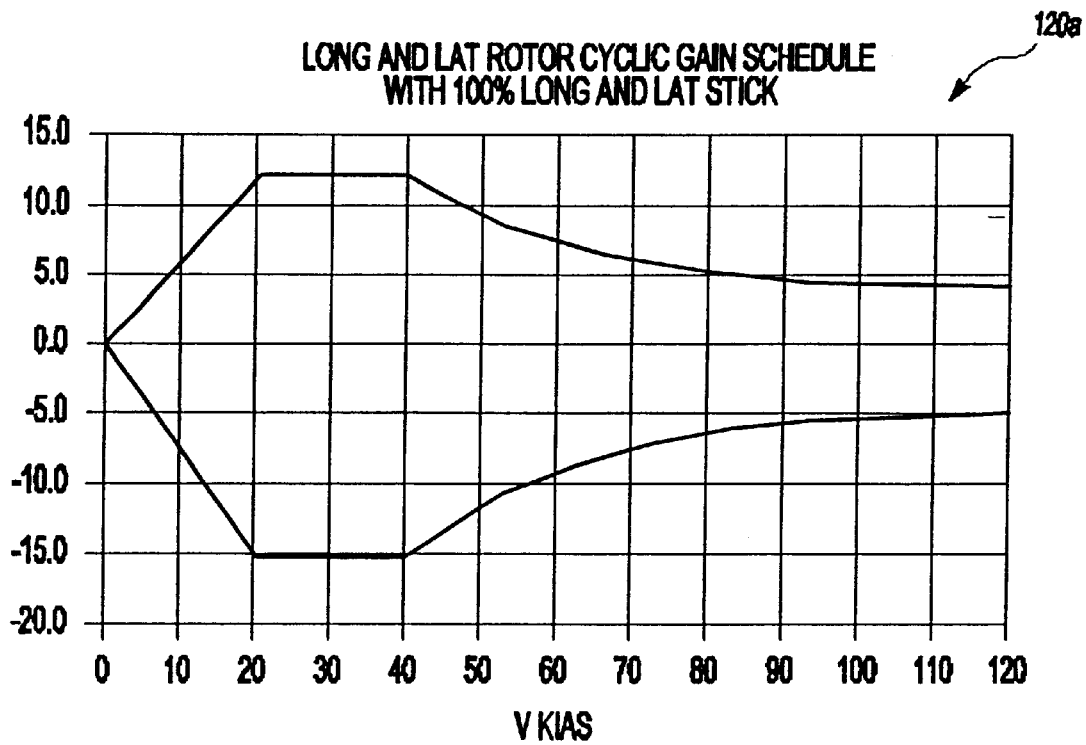
FIG. 4 is one embodiment of an exemplary rudder gain schedule for the vehicle of FIG. 1.
Figure 5:
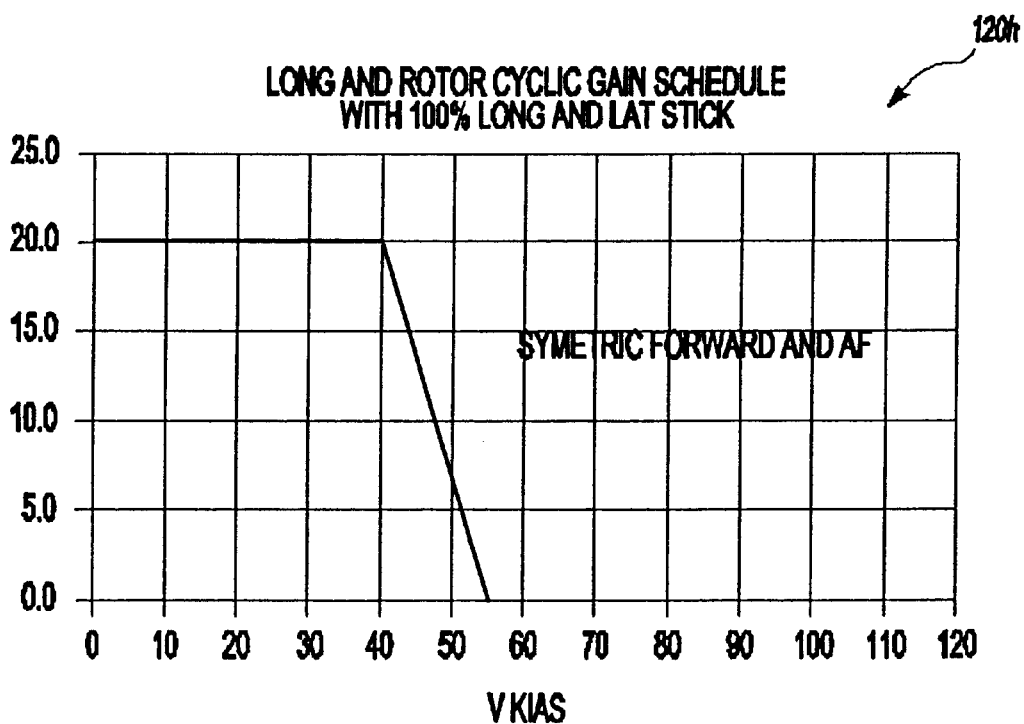
FIG. 5 is one embodiment of an exemplary differential collective gain schedule for the vehicle of FIG. 1.

From the roll summing circuit 106, the roll command 80 is split into separate command paths 118a and 118h. Each command path 118a, 118h is respectively multiplied by an aileron gain 120a' and a roll cyclic gain 120h' at multipliers 122a, 122h. The aileron gain 120a' is determined by an aileron gain schedule 120a (FIG. 4) which relates the velocity (air speed) of the vehicle 10 to allowable aileron control 102 deflection. The roll cyclic gain 120h' is determined by a roll cyclic gain schedule 120h (FIG. 5) which relates the velocity (air speed) of the vehicle 10 to the allowable cyclic deflection for the roll axis. The gain schedules are preferably quantitative measures of control effectiveness.

Based upon the respective gain schedule 120A, 120h, the roll blending algorithm 74 roll determines how much of the roll input command 80 is sent to each movable control surface (through roll cyclic control 94 and/or aileron control 96.)

For example only, in the illustrated embodiment, no roll cyclic deflection is available when the velocity of the vehicle 10 exceeds 55 kias. If, for example, only the vehicle 10 is travelling at a velocity of 100 kias, the entire roll command 80 is sent to the ailerons 60p (roll cyclic gain 120h'=0). The aileron deflection, however, is scaled to provide approximately +4 and −5 degrees of aileron deflection. The shifting of the positive aileron deflection relative to the negative aileron deflection is preferable when the aileron control surfaces 60P (FIG. 1A) are flaperons. Other mirrored and shifted gains schedules for the +/− deflections will also benefit from the present invention. Preferably, the gain schedules 120a, 120h are determined so that for any given control command, the same amount of vehicle moment will be generated regardless of flight regime. That is, the gain schedules assure that the vehicle responds in a substantially identical manner independent of it velocity. This simplifies the underlying flight control system laws since the command the flight control system generates provide the desired moment regardless of flight regime.

Preferably, the blending algorithm 74roll manages control limits so that if one control surface is at its maximum limit of travel, the other control surface assists the saturated control surface. That is, the roll blending algorithm 74roll adds in aileron control authority if the roll cyclic is at its maximum deflection even if the additional aileron control authority may not be effective. This minimizes the possibility of entering uncontrolled flight due to unavailable control authority.

The main limit is that of the roll integrator 114. When the roll cyclic 94 reaches its full deflection, aileron control 96 is added in by the blending algorithm 74. For example only, if the vehicle is traveling forward at a relatively low velocity, and a large roll input command 80 is provided, roll cyclic control 94 may not provide the necessary control authority commanded by the flight control system 24. The blending algorithm 74roll responds by maintaining the roll cyclic control 94 at full deflection while adding in aileron control 96 until the desired response is achieved.

Furthermore, while it is understood it still is worth stating that the present invention is not limited to a microprocessor based control system. The system may be implemented in a non-microprocessor based electronic system (either digital or analog).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A flight control system for a hybrid aircraft comprising:
   a movable first control surface not operable connected to a rotor system operable to direct an aircraft about a roll axis;
   a movable second control surface on a rotor system operable to direct the aircraft about said roll axis;
   a storage device having a blending algorithm, said blending algorithm determining a first gain for said first control surface according to a first gain schedule, and determining a second gain for said second control surface according to a second gain schedule in response to a control input for said roll axis; and
   a controller in communication with said first control surface, said second control surface, and said storage device, said controller operable to receive a control command for said roll axis and actuate said first control surface according to said first gain and said second control surface according to said second gain.

2. The flight control system as recited in claim 1, wherein said first gain schedule and said second gain schedule relate control surface deflection to vehicle airspeed.

3. The flight control system as recited in claim 1, wherein said first control surface includes an aileron.

4. The flight control system as recited in claim 3, wherein said first control surface includes a flaperon.

5. The flight control system as recited in claim 1, wherein said second control surface includes a swashplate to effect a roll cyclic change in a rotor system.

6. The flight control system as recited in claim 5, wherein said rotor system includes a coaxial counter rotating rotor system mounted within a duct.

7. The flight control system as recited in claim 1, wherein said hybrid aircraft is an unmanned aerial vehicle.

8. A method of controlling a hybrid aircraft about a roll axis comprising the steps of:
   (1) providing a control command for a roll vehicle axis;
   (2) splitting said control command to provide a first control command and a second control command;
   (3) multiplying said first control command by a first gain according to a first gain schedule to provide a first scaled control command;
   (4) multiplying said second control command by a second gain according to a second gain schedule to provide a second scaled control command;
   (5) communicating said first scaled control command to a first movable control surface not operably connected to a rotor system, for control of the hybrid aircraft about the roll axis; and
   (6) communicating said second scaled control command to a second movable control surface, on a rotor system for control of the hybrid aircraft about the roll axis.

9. A method as recited in claim 8, wherein said step (1) includes a proportional plus integral control command.

10. A method as recited in claim 9, further including limiting said integral control command.

11. A method as recited in claim 9, further including limiting said second scaled control command.

12. A method as recited in claim 11, further including:
   identifying when the limit of said second scaled control command is reached, and
   holding an integral control command of said second control command in a limited direction in response to said identifying step.

13. A method as recited in claim 11, further including:
   identifying when the limit of said second control command is reached, and
   adding in said first control command to assist said second control command.

14. A method as recited in claim 8, wherein said first and second scaled control command provide the same amount of aircraft roll moment about the roll axis independent of the hybrid aircraft flight regime.

15. A method of controlling a hybrid unmanned aerial vehicle (UAV) about a roll axis within a transition flight region comprising the steps of:
   (1) providing a control command for a roll axis;
   (2) splitting said control command to provide a first control command and a second control command;
   (4) multiplying said first control command by a first gain according to a first gain schedule to provide a first scaled control command;
   (4) multiplying said second control command by a second gain according to a second gain schedule to provide a second scaled control command;
   (7) communicating said first scaled control command to a rotor system for control of the UAV about the roll axis; and
   (8) communicating said second scaled control command to a aileron for control of the UAV about the roll axis.

16. A method as recited in claim 15, wherein said step (1) includes a proportional plus integral control command.

17. A method as recited in claim 15, wherein said first and second scaled control command provide the same amount of roll moment about the roll axis independent of the UAV flight regime.

18. A method as recited in claim 15, further including limiting said second scaled control command.

19. A method as recited in claim 18, further including:
   identifying when the limit of said second control command is reached, and
   adding in said first control command to assist said second control command.

* * * * *

UNITED STATES PATENT AND TRADEMARK OFFICE
CERTIFICATE OF CORRECTION

PATENT NO.      : 6,431,494 B1
DATED           : August 13, 2002
INVENTOR(S)     : Kinkead et al.

It is certified that error appears in the above-identified patent and that said Letters Patent is hereby corrected as shown below:

Column 7,
Line 29, "operable" should be -- operably --

Signed and Sealed this

Fourteenth Day of January, 2003

JAMES E. ROGAN
*Director of the United States Patent and Trademark Office*